(12) United States Patent
Yeomans

(10) Patent No.: US 6,516,895 B2
(45) Date of Patent: Feb. 11, 2003

(54) TOOL SHANK MOUNTING ASSEMBLY

(76) Inventor: Allan James Yeomans, 60 Sunrise Blvd., Surfers Paradise QLD 4217 (AU)

(*) Notice: Subject to any disclaimer, the term of this patent is extended or adjusted under 35 U.S.C. 154(b) by 0 days.

(21) Appl. No.: 09/784,606

(22) Filed: Feb. 15, 2001

(65) Prior Publication Data

US 2001/0017211 A1 Aug. 30, 2001

(30) Foreign Application Priority Data

Feb. 25, 2000 (AU) .......................................... 19457/2000

(51) Int. Cl.$^7$ .............................................. A01B 15/00
(52) U.S. Cl. .................... 172/744; 172/762; 172/763; 403/356; 403/358; 403/370; 403/374.4; 403/409.1
(58) Field of Search ................................ 172/763, 762, 172/681, 744, 734; 403/358, 370, 374.3, 374.4, 374.2, 374.1, 373, 368, 367, 365, 356, 355, 345, 409.1

(56) References Cited

U.S. PATENT DOCUMENTS

| | | | | |
|---|---|---|---|---|
| 82,835 A | * | 10/1868 | Hixson | |
| 511,039 A | * | 12/1893 | Bowen | |
| 814,051 A | * | 3/1906 | Jones | |
| 1,417,207 A | * | 5/1922 | Schutt | |
| 1,622,619 A | * | 3/1927 | Warren | |
| 1,838,355 A | * | 12/1931 | Benjamin | |
| 2,242,793 A | * | 5/1941 | Philbrick | |
| 2,521,045 A | * | 9/1950 | Cornell | |
| 3,022,836 A | * | 2/1962 | Bechman | 172/698 |
| 3,235,013 A | * | 2/1966 | Kirkpatrick, Jr. | |
| 4,033,417 A | * | 7/1977 | Rau et al. | 172/762 X |
| 4,190,115 A | * | 2/1980 | Couture | 172/762 X |
| 4,576,239 A | * | 3/1986 | Launder | 172/762 X |
| 4,976,566 A | * | 12/1990 | Yeomans | 172/762 X |
| 6,095,255 A | * | 8/2000 | Geertson | 172/763 X |
| 6,158,524 A | * | 12/2000 | Geertson | 172/763 |

* cited by examiner

*Primary Examiner*—Christopher J. Novosad
(74) *Attorney, Agent, or Firm*—Wood, Phillips, Katz, Clark & Mortimer

(57) ABSTRACT

A mounting assembly for a shank including a shank holder having a passage for receiving the shank, the passage having at one end opposite tapering surfaces which define with the leading edge of the shank opposite tapering spaces for receiving wedge members. Bolts are provided between the wedging members and holder to urge the wedging members longitudinally of the passage to wedge the shank in a selected position relative to the holder.

14 Claims, 4 Drawing Sheets

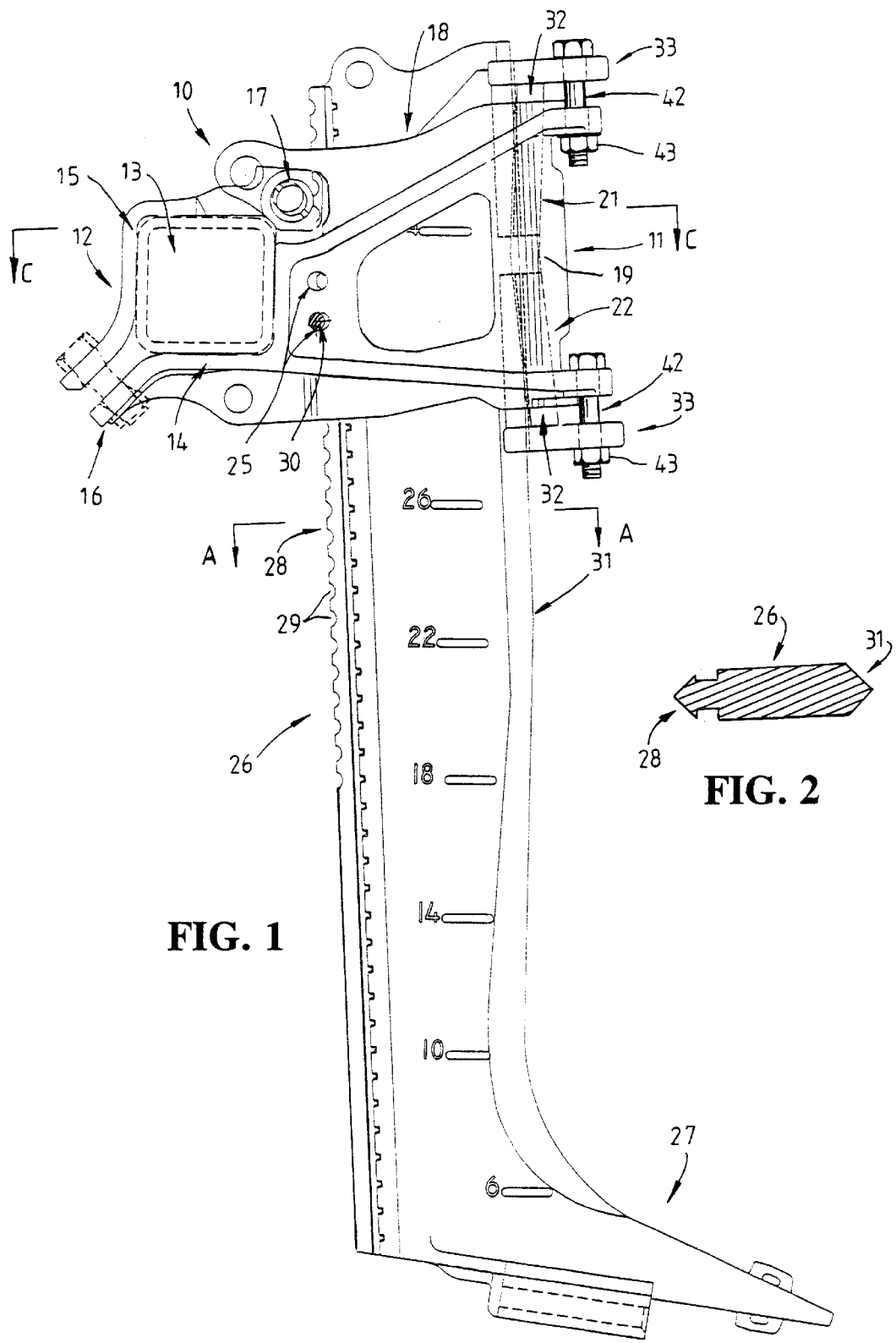

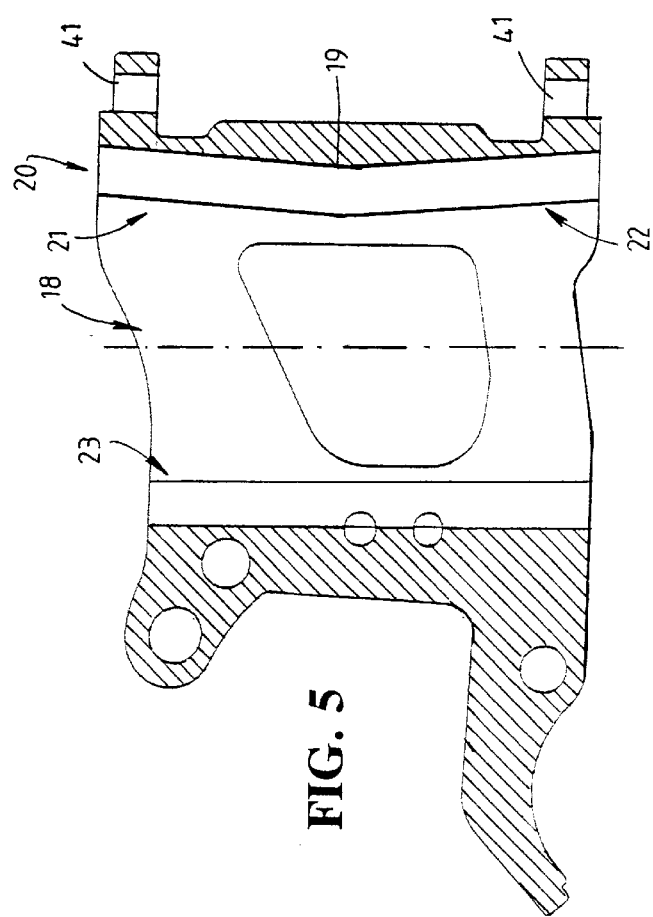
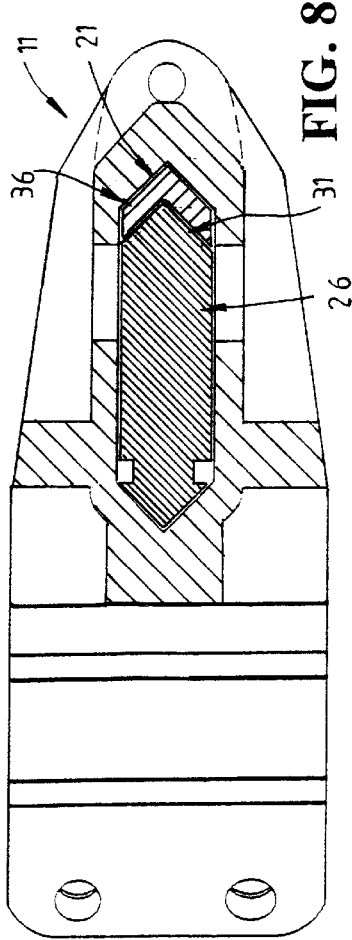

TOOL SHANK MOUNTING ASSEMBLY

TECHNICAL FIELD

The present invention relates to a tool shank mounting assembly for the mounting of shanks of earth working tools.

BACKGROUND ART

It is a common procedure to mount shanks of earth working tools to tool bars of agricultural equipment. It is desirable that the vertical height of the shank and thus the tool carried by the shank be conveniently adjustable. It is also desirable that the mounting arrangement for the shank firmly holds the shank in place when operating the shank and coupled tool in the ground. Tools which are attached to shanks in many cases can have considerable span to either side of the shank. Tools of this type, tend to apply twisting loads to shank and thus the shank mounting arrangement.

A common system for mounting shanks is to provide a series of holes in the shank, with cheek plates provided on opposite sides of the shank and mounted to the tool bar and bolts which are passed through the cheek plates and a selected hole or holes in the shank to set the height of the shank and clamp the shank in position. Vertical adjustment of the shank in such an arrangement is time consuming as the bolts have to be removed to allow the shank to be adjusted in height and then reinserted in a further hole or holes and through the shank. Further, the formation of such holes generally reduces the strength of the shank. In another system, serrated tracks are provided in the rear of the shank which is again clamped between two cheek plates. Bolts which clamp the plates together also cooperate with the track for positive height location of the shank. This arrangement is also time consuming to adjust and height of the shank in this system is limited by the spacing of the serrations. In yet a further arrangement, the tool shank is frictionally gripped between a pair of cheek plates which are clamped by bolts onto opposite sides of the shank. Cheek plates where used are difficult to keep tight when subject to inevitable asymmetric side loads.

SUMMARY OF THE INVENTION

The present invention aims to overcome or alleviate one or more of the above described disadvantages or at least provide an alternative to the current shank mounting systems. It is a preferred object of the present invention to provide a mounting assembly which will allow for the quick and easy adjustment of the height of shanks and tools carried thereby. It is another preferred object of the present invention to provide an assembly which will provide a secure mounting for the shank and which will withstand large side loads which are incurred by the shank. Other objects, aspects, and advantages of the present invention will be apparent from the following description.

The present invention thus provides in one aspect, a mounting assembly for mounting the shank of an earth working tool, said assembly comprising:
a shank holder having a passage therethrough adapted to receive said shank, said passage having at least one side wall,
a wedge member adapted for wedging between said shank and a said side wall of said passage to secure said holder to said shank at a selected position along said shank, and
means for selectively urging said wedge member longitudinally of said passage.

Preferably, the passage tapers in cross section inwardly from at least one end. Suitably the wedge member is adapted to cooperate with the tapered passage such that when urged longitudinally of the passage, the wedge member moves in parallelism inwardly towards the adjacent edge portion of the shank to wedge the shank in position. The urging means may include a bolt between the wedge member and holder.

The present invention in a further aspect provides a mounting assembly for mounting the shank of an earth working tool, said assembly comprising:
a shank holder having a passage therethrough adapted to receive said shank, said passage having at least one side wall,
a pair of wedge member adapted to be located at opposite ends of said passage for wedging between said shank and a said wall of said passage to secure said holder to said shank at a selected position along said shank, and
means for selectively urging said wedge members longitudinally of said passage and towards each other.

Preferably in this aspect, the passage tapers in cross section inwardly from one end of the passage towards a point substantially halfway along the passage and then tapers outwardly to the other end of the passage. The tapers in the passage are suitably defined by an end wall of the passage which is inclined or angled inwardly relative to the longitudinal axis of the passage from one end towards the point substantially halfway along the passage and then is inclined or angled outwardly to the opposite end of the passage.

The pair of wedging members are adapted to be received between the leading edge portion of the shank and the tapering walls of the passage which define therebetween tapering spaces so that the shank is wedgingly held at spaced positions. Separate means may be provided to urge the wedging members in opposite directions relative to the longitudinal axis of the passage. The separate urging means may comprise bolts between the wedging members and holder. For this purpose, the wedging members may include apertured end plates and the holder is provided with aligned apertures, preferably provided in flanges, to receive the bolts.

Alternatively, single urging means such as a bolt may be provided between the wedging members to urge the wedging members longitudinally and relatively towards each other. The single urging means may comprise a bolt which passes through the apertured end plates of the wedge members and the apertures in the holder. Tightening the bolt will thus urge the wedge members towards each other to firmly wedge the shank in position.

Preferably, the passage in cross section is generally complementary to the cross sectional form of the shank and suitably includes opposite side walls which are spaced apart a distance slightly greater than the spacing between the front and rear, or leading and trailing edges of the shank.

Suitably the opposite ends of the passage are of V-shaped cross section and the leading edge portion of the shank is also of V-shaped cross section. Preferably, the V-shaped ends and edge portion have an included angle of approximately 90 degrees. Each wedging member preferably includes a leg which is of V-shaped cross section and complementary to the V-shaped cross section of the passage and shank leading edge portion. The leg of the wedging member is preferably of tapering form in cross section to match the inclination of the inclined surfaces of the passage such that when the wedging member is moved slidably into the passage in contact with the inclined end of the passage, the leg of the wedging member moves inwardly in parallelism. This is achieved by having the operative forward V-sectioned surface of the wedge member at an inclination matching the inclination of the complementary inclined surface of the passage. The rear V-shaped surface of the wedging member preferably extends substantially parallel to the longitudinal axis of the passage and thus to the longitudinal axis of the shank so that the leg of the wedging member engages the leading edge of the shank along its full length. Where two wedging members are employed, this is achieved at spaced apart positions in the passage.

The opposite end wall of the passage may also be of V-shaped cross section for cooperation with a similarly shaped V-shaped trailing edge of the shank. Again the V-shaped cross sections have an included angle of approximately ninety degrees.

The V-shaped cross section of the leading edge of the passage and complementary form of the wedge and shank provides a substantial surface (defined by the faces of the V's) to resist twisting loads applied to the shanks. A similar effect can be achieved by substituting for the V-shaped cross sections of the shank, holder passage and wedge members, a part-circular cross section or a multi-surface cross section or any other sectional form which will resist twisting loads on the shank.

The present invention in yet a further aspect provides in combination a tool shank and tool holder, said tool shank having a leading end of substantially V-shape in cross section, and said tool holder having a passage therethrough receiving said tool shank, the leading end of said passage being of V-shape in cross section, and a pair of pair of wedge members at opposite end of said passage, each said wedge having a leg portion of V-shaped cross section extending between said leading end of said passage said tool shank, and means for selectively urging said wedge members into said passage.

Preferably the leading end of the passage is inclined inwardly towards the leading end of the shank from the opposite end of the passage to define openings of tapering cross section for receipt of the leg portions of the wedge members. Preferably, the leg portions of the wedge members have a corresponding taper in cross section.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 1 illustrates a tool shank engaged with a tool holder according to a preferred embodiment of the invention;

FIG. 2 is a sectional view of the shank along line A—A of FIG. 1;

FIG. 5 is an enlarged sectional view of the main holder part along line B—B of FIG. 3;

FIGS. 6 and 7 illustrate a wedge member in side and elevational view.

FIG. 8 is a sectional view along line C—C of FIG. 1 showing the main holder part and engagement between a wedge member and shank.

DESCRIPTION OF THE PREFERRED EMBODIMENT

Figure 3:
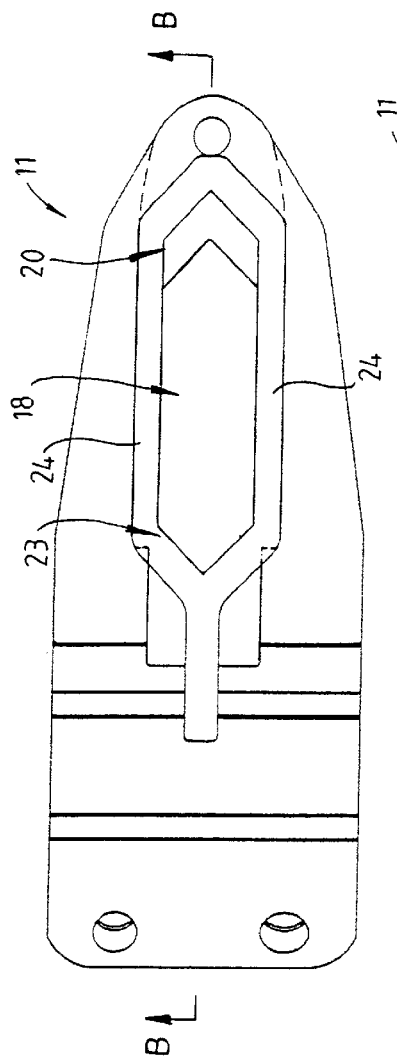
FIGS. 3 and 4 illustrates the main holder part in plan and side elevational view.

Referring to the drawings and firstly to FIG. 1, there is illustrated a shank holder 10 which is formed in two parts 11 and 12 which cooperate in this embodiment for attachment to a square sectioned tool bar 13. The main part 11 of the holder 10 includes a right angled facing plate 14 and the other part 12 includes a clamping plate 15. In use, the facing plate 14 is juxtaposed with a pair of faces of the tool bar 13 and the clamping part 15 is juxtaposed with the other two faces of the tool bar 13 and the facing plate 14 and clamping plate 15 cooperate to clamp onto the tool bar 13 by means of bolts 16 on one side and a shear pin connection 17 on their other side. Such a clamping arrangement is disclosed in my Australian patent No. 655449. It will of course be appreciated that the holder 10 may be attached to any form of tool bar, frame or machinery and may be attached thereto by any suitable arrangement. Further the holder 10 as shown in FIG. 1 is shown forwardly of the tool bar 13. It may have be provided on the rear side of the tool bar 13 and also inverted if desired.

Figure 4:
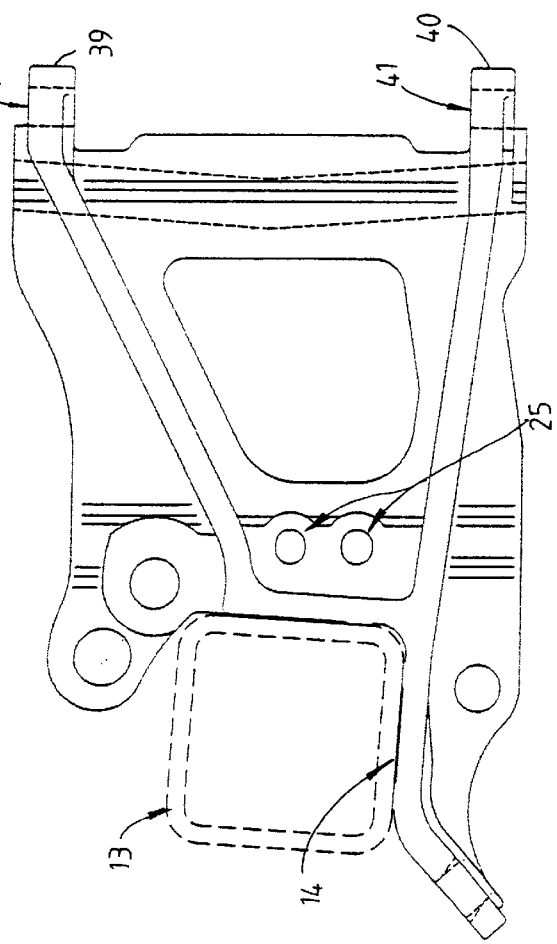

The holder 10 includes as shown also in FIGS. 3 to 5, a passage 18 which extends through the holder 10 which is oblong form in cross section. The passage 18 in use extends substantially normal to the tool bar 13 to which the holder 10 is secured in use and is oriented generally vertically.

The opening 18 at its forward and rearward ends is V-shaped in cross section and tapers in cross section longitudinally from each end towards a point 19 substantially halfway along the passage 18 where it is of minimum width. This is achieved by forming the forward V-shaped surface 20 of the passage 18 as a first portion 21 which slopes or is angled slightly inwardly relative to the longitudinal axis of the passage 18 from the top to the point 19 of the passage 18 and then slopes or is angled outwardly towards the bottom of the opening 18 as at 22. A four degree angle from vertical or from the longitudinal axis of the passage 18 has been found to be a suitable angle for the surfaces 21 and 22. The opposite end wall 23 of the passage 18 which is also V-shaped in plan view extends substantially parallel to the longitudinal axis of the passage 18.

The opposite side walls 24 of the passage 18 are substantially parallel to one another and spaced apart a distance slightly greater than the distance between the opposite sides of a shank 26 to be received in the passage 18 whereby the shank may be moved freely longitudinally in the passage 18 until secured in position. The holder 10 may also be provided in opposite sides with aligned openings 25 to receive a pin or bolt for cooperating with a shank to be mounted to the holder 10 as described further below.

A typical shank 26 which may be suitably secured at its upper end to the tool bar 13, for example the tool bar 13 of an earthworking or agricultural device, via the holder 10, is shown in FIGS. 1 and 2. The shank 26 has an integrally formed foot 27 at its lower end. The shank 26 at its rearward or trailing edge 28 is of substantially V-shaped form in cross section which is complementary to the V-shaped surface 23 of the passage 18, the V-shaped edge 28 having an included angle of approximately ninety degrees. The edge 28 may also includes a plurality of equally spaced indentations 29 with which a bolt or pin 30 passed through the opening/s 25 may cooperate to provide additional security if required to set the height of the shank 26. The opposite or leading edge 31 of the shank 26 is also of V-shaped cross section with an included angle of approximately 90 degrees to be complementary to the surface 21 or 22.

The width of the shank 26 is slightly narrower than the distance between the side walls 24 of the holder opening 18 and the distance between the V-shaped edges 29 and 31 is less than the minimum width of the passage 18 at the point 19 to permit the tool shank 26 to be passed into the passage 18 and allow vertical movement of the tool shank 26 relative to the holder 10. The distance between leading and trailing edges 31 and 28 of the shank 26 is such that when received in the passage 18, the forward V-shaped edge 31 of the shank 26 has substantial clearance to the rear surfaces 21 and 22 of the opening 18 so that, when the holder opening 18 receives the shank 26, tapering gaps 32 are defined at opposite ends of the passage 18 to permit the insertion of the wedging members 33 between the passage walls 21 and 22 and shank 26.

The wedging members 33 as shown more clearly in FIGS. 6 and 7 include an end plate 34 and a depending leg 35 which has front and rear V-shaped surfaces 36 and 37 which have included angles which are substantially ninety degrees to cooperate with the rear surfaces 21 and 22 of the holder passage 18 and edge 31 of the shank 26 as will become apparent. The surfaces 37 extend substantially at right angles to the plate 34 whilst the surfaces 36 are inclined slightly to the plate 34 at a similar inclination to the surfaces 21 and 22 so that the leg 35 is of tapered form. The end plate 34 is also provided with a central aperture 38. The holder 10 includes upper and lower flanges 39 and 40 which extend forwardly of the opening 18 and which are provided with apertures 41 which are aligned with each other and in use with the apertures 38 in the end plates 34 of the wedging members 33.

The shank holder 10, wedging member 33 and shank 26 can be made of any suitable material such as by being cast metal and by any suitable method known to those skilled in art.

In use and as shown in FIGS. 1 and 8, the opening 18 of the holder 10 is slid over the shank 26 until the holder 10 is at the desired height for the shank 26 as shown in FIG. 1. A wedging member 33 is then inserted from the top between the shank forward edge 31 and passage surfaces 21 and whilst a further wedging member 33 is inserted from the underside between the shank forward edge 31 and passage 22. The surface 36 of the wedging member 33 is thus juxtaposed with the surface 21 (or 22) and the opposite surface 37 juxtaposed with the edge 31 of the shank 26. Bolts 42 may be inserted between aligned apertures 38 and 41 in the end plates 34 of the wedging members 14 and flanges 39 and 40 and engaged with nuts 43. The nuts 43 may then be tightened to urge the wedging members 33 longitudinally of the passage 18 in the spaces 32 between the shank end 31 and surfaces 21 and 22 with the respective V-shaped surfaces of the wedging members 33 mating with the complementary surfaces in the passage 18 and at the edge 31 of the shank 26. As the angle of the wedging member surface 36 is substantially the same as the angle of the surfaces 21 and 22, the wedging surfaces 36 will move in parallelism towards the central axis of the passage 18 as the wedging members 33 are urged further into the passage 18 so that the trailing edge 28 of the shank 26 is forced into engagement with the passage surface 23. The shank 26 thus becomes firmly gripped at spaced positions and is thus accurately located at a desired position relative to the holder 10. Further, the cooperating V-shaped surfaces of the shank 26, the holder passage 18, and the wedging member 33 provide excellent load bearing for not only the rearward and forward stresses which are incurred, but also for the large side loads which are incurred by the shanks 26.

Figure 9:
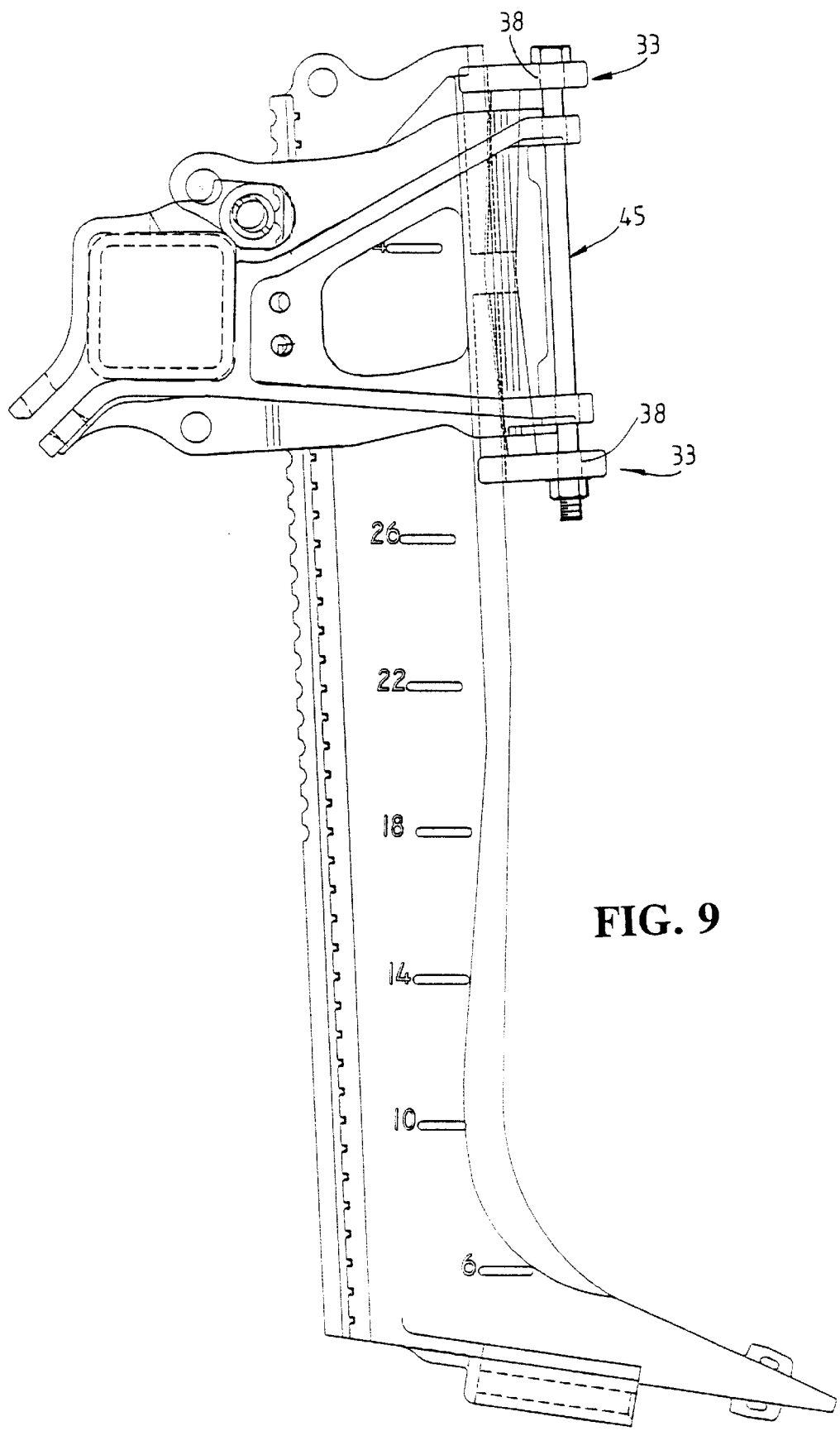
FIG. 9 illustrates the shank engaged with the holder in further embodiment.

In a further arrangement shown in FIG. 9, a single bolt 45 may be proved to extend between both wedging members 33 passing through the end plate apertures 38 and holder apertures 42 and tightened to draw the wedging members 33 relatively towards each other. Such an arrangement will ensure that equal force will be applied to each wedging member 33.

Where a pair of wedging members 33 are used, the tool shank 26 is clamped to the holder at spaced position providing full support, minimizing movement or rattle of the shank 26 relative to the holder thereby minimizing wear. In addition, the spaced support of the tool shank 26 resists twisting of the shank 26 in the event say that the tool point 27 or tool carried thereby strikes an obstruction with load transferred to the V-surfaces of the passage 18.

In a simplified form, only one wedging member 33 may be provided either at the top or bottom of the holder 10 and secured in position by a bolt 42 and nut 44 as described above.

The connection arrangement described above permits infinite adjustment of the position of the tool shank 26 relative to the holder 10 by simply locating the tool shank 26 at a required position and applying a wedging member or members 33. Removal of the shank 26 may simply be easily accomplished by a hammer blow under the end plates 34 after the bolts have been removed, which will free the wedging members 33 which can then be removed.

Whilst the ends of the shank 26 are preferably of V-shaped form and the ends of the passage 18 and leg of the wedging members 33 correspondingly shaped, they may be of other configurations such as or part circular form or of multi surface form in cross section.

The above has been given by way of illustrative embodiment of the invention however it will be realized that many variations and modifications may be made thereto by persons skilled in the art without departing from the broad scope and ambit of the invention as herein set forth.

I claim:

1. A mounting assembly for mounting the shank of an earth working tool, said assembly comprising:
   a shank holder having a passage therethrough adapted to receive said shank, said passage having at least one side wall,
   a pair of wedge members adapted to be located at opposite ends of said passage for wedging between said shank and a said wall of said passage to secure said holder to said shank at a selected position along said shank, and
   means for selectively urging said wedge members longitudinally of said passage and towards each other.

2. A mounting assembly according to claim 1 wherein said passage tapers in cross section inwardly from one end of the passage towards a point substantially halfway along the passage and then tapers outwardly to the other end of the passage.

3. A mounting assembly according to claim 2 wherein said tapered passage is defined by an end wall of the passage which is inclined or angled inwardly relative to the longitudinal axis of the passage from one end towards said point substantially halfway along said passage and then is inclined or angled outwardly to the opposite end of said passage.

4. A mounting assembly according to claim 3 wherein said urging means comprise separate urging means between each said wedging member and said holder.

5. A mounting assembly according to claim 4 wherein said urging means comprise bolts between the wedging members and holder.

6. A mounting assembly according to claim 5 wherein said wedging members include apertured end plates and the holder is provided with aligned apertures to receive said bolts.

7. A mounting assembly according to claim 1 wherein said urging means comprises means between said wedging members for urging the wedging members longitudinally and relatively towards each other.

8. A mounting assembly according to claim 7 wherein said urging means comprise a bolt which passes through apertures in each said wedge member whereby tightening of said bolt will urge said wedge members towards each other.

9. A mounting assembly according to claim 1 wherein an end of said passage adjacent said wedge members is of V-shaped cross section.

10. A mounting assembly according to claim 9 wherein the or each said wedging member includes a leg which is of V-shaped cross section and has a surface complementary to the V-shaped cross section of said passage.

11. A mounting assembly according to claim 10 wherein said leg of said wedging member tapers in cross section towards the free end thereof.

12. In combination a tool shank and tool holder, said tool shank having a leading end of substantially V-shape in cross section, and said tool holder having a passage therethrough receiving said tool shank, the leading end of said passage being of V-shape in cross section, and a pair of pair of wedge members at opposite end of said passage, each said wedge having a leg portion of V-shaped cross section extending between said leading end of said passage said tool shank, and means for selectively urging said wedge members into said passage.

13. The combination of claim 12 wherein the leading end of the passage is inclined inwardly towards the leading end of the shank from the opposite ends of the passage to define openings of tapering cross section for receipt of the leg portions of the wedge members.

14. The combination of claim 13 wherein the leg portions of the wedge members taper in cross section for cooperation with the tapering cross sections of said openings.

* * * * *